3,035,916
PROCESS FOR RENDERING POLYESTER FILM RECEPTIVE TO PHOTOGRAPHIC MATERIALS AND RESULTING ELEMENTS
Robert Bernard Heiart, Matawan, N.J., assignor to E. I. du Pont de Nemours and Company, Wilmington, Del., a corporation of Delaware
No Drawing. Filed Jan. 27, 1959, Ser. No. 789,252
16 Claims. (Cl. 96—87)

This invention relates to highly polymeric polyester films having colorless hydrophilic surfaces and to their preparation. More particularly, it relates to highly polymeric polyester films corresponding to the polyester reaction product of (1) at least one dihydric alcohol of the formula $HOCH_2$—$W_n$—$CH_2OH$ where W is methylene, polymethylene or an alkyl-substituted polymethylene chain of 1 to 8 carbon atoms, or a cycloalkylene radical of 5 to 6 carbon atoms and $n$ is 0 or 1, and (2) one or more aromatic dibasic carboxylic acids of which at least 15 mole percent is terephthalic acid and in which up to 20 mole percent can be an aliphatic dicarboxylic acid, having clear (colorless) hydrophilic surfaces. The invention also relates to such films bearing a layer of a hydrophobic copolymer, or a water-permeable colloid, or one or more of such layers. The invention also relates to photographic film elements having such bases and a water-permeable colloid silver halide emulsion layer. The invention also relates to processes for preparing the just-described photographic film bases and coated films.

In assignee's Cohen and Heiart U.S. application Ser. No. 783,313 filed Dec. 29, 1958, there is disclosed a process for imparting hydrophilic properties to the surfaces of highly polymeric polyester films of the type described above. In this process said polyester films are treated with a solution comprising 82–98.8 parts by weight of $H_2SO_4$, 1–14.5 parts by weight of water and an amount of chromic acid-yielding compound equivalent to 0.1–4.0 parts by weight $Cr_2O_3$ until a hydrophilic surface is formed. The treated films are then contacted with an excess of water. Depending on the amounts of $H_2SO_4$ and water, surfaces which are transparent to translucent can be obtained. In some cases, however, the surfaces are somewhat yellow in color and this is disadvantageous for certain purposes, particularly in the preparation of some photographic films.

An object of this invention is to provide an improved process for imparting hydrophilic properties to the surface of polymeric polyester films of the above type and obtaining essentially colorless products. Another object is to provide a process for bleaching the yellow color from highly polymeric polyester films having hydrophilic properties. Another object is to provide improved highly polymeric polyester films having transparent to translucent, essentially colorless hydrophilic surfaces. A further object is to provide such films which are adherent to water-permeable colloid layers. A still further object is to provide photographic films embodying the improved film bases just described. Still further objects will be apparent from the following description of the invention.

According to the invention, improved highly polymeric polyester films having hydrophilic surfaces can be made (a) by treating the surface, or surfaces, of a polyester film composed essentially of a polyester corresponding to the reaction product of (1) at least one dihydric alcohol of the formula $HOCH_2$—$W_n$—$CH_2OH$ where W is a divalent hydrocarbon radical taken from the group consisting of methylene, unsubstituted and alkyl-substituted polymethylene radicals of 1–8 carbon atoms and cycloaliphatic radicals of 5–6 carbon atoms, and $n$ is a number taken from the group consisting of 0 and 1, and (2) at least one aromatic dicarboxylic acid of which at least 15 mole percent is terephthalic acid and up to 20 mole percent can be at least one aliphatic dicarboxylic acid, with a treatment solution comprising 82.0–98.8 parts by weight $H_2SO_4$, 1.0–14.5 parts by weight of water and an amount of chromic acid-yielding compound equivalent to 0.1–4.0 parts by weight $Cr_2O_3$, and (b) contacting the surfaces of the treated film with an excess of water and (c) contacting the treated surface or surfaces of the resulting film with a 0.5–30% aqueous alkali metal hydroxide solution, preferably NaOH or KOH, at a temperature of 5°–80° C. for approximately one second or more and, preferably, for about 10 to 60 seconds whereby clear (essentially colorless) hydrophilic surfaces are obtained. The bleached film can then be washed with water in order to remove excess alkali and is dried.

In carrying out the process, immediately after the treatment of the surfaces in the acid bath the film is contacted with an excess of water. Preferably, the film is quenched in a quiescent or non-turbulent water bath maintained at a temperature from about 10° C. to about 15° C. whereby excess salts and other soluble materials are removed from the surfaces of the film. The quenched film is then thoroughly washed with water and then may be dried before treatment in the alkali metal hydroxide solution. The acid-treated, alkali metal hydroxide-treated polyester films can then be coated, before or after drying, with a desired material, e.g., a light-sensitive diazo or an alkali metal bichromate solution in a water-permeable colloid; a coating solution containing a water-permeable organic colloid having protective colloid properties and free from or containing light-sensitive silver halide and/or other photographic emulsion adjuvants; or a coating solution containing a hydrophobic copolymer. In the case of photographic films, one prepared hydrophilic surface may be coated with an antihalation, antistatic, or other layer, and the other coated with an aqueous gelatin subbing solution and/or with a gelatino-silver halide emulsion layer. The layer may contain colloidal silver or an antihalation pigment or dye. Moreover the antihalation layer may be on the same side of the base as the photographic emulsion. The hydrophilic surfaces of the bleached polyester films, moreover, can be coated with photopolymerizable image-yielding compositions of the type described in Plambeck U.S. Patents 2,760,863 and 2,791,504.

The surface or surfaces of polyester film, e.g., polyethylene terephthalate film, are contacted with the acid treatment solution for a period sufficient to confer the desired hydrophilic properties. The length of time for this treatment will, of course, vary with the particular polymeric film, the composition of the acid treatment solution, the temperature of said solution and the manner in which the polymeric film is brought into contact with the acid treatment solution. The conditions and suitable treatment solutions are described in the aforementioned application Ser. No. 783,313. In the drawing of this latter application, pentagonal, hexagonal and quadrangular areas are given, encompassing ranges of concentration for the various constituents whereby essentially transparent or essentially translucent films can be obtained. In general, where the film is contacted with, or immersed in, or passed through, the treatment solution, each square inch of the film should be in contact with the solution for about 0.1 second to about 60 seconds. The temperature of the acid treatment solution can range from about 0° C. to about 60° C., preferably 5° to 30° C.

The invention will be further illustrated by, but is not intended to be limited to, the following detailed examples, which describe preferred and practical operating conditions for making polyester films having colorless hydrophilic surfaces.

Example I

Fifty grams of $Na_2Cr_2O_7 \cdot 2H_2O$ was put into 500 ml. of concentrated $H_2SO_4$ (S.G. 1.841 to 1.844 at 60° F.) and the resultant solution cooled to 5° C. Three separate 5 by 7-inch sheets of uncoated polyethylene terephthalate photographic film base stretched, heat-set and heat-relaxed as described in Alles U.S. Patent 2,779,684, were immersed for 1, 5 and 15 seconds, respectively, in the cold acid solution. The films, after treatment, were transferred to a cold quiescent water bath (15° C.) where the excess acid, salts, and other water-soluble materials were removed from the surface. The films were then washed for at least 5 minutes with cold tap water and then dried. The treated films, which had hydrophilic translucent surfaces, yellow in color, were immersed for 2 minutes in 20% aqueous NaOH maintained at 40° C. The sheets were washed in cold (15° C.) running water for 5 minutes and air-dried at room temperature (about 15° C.). The resultant films produced were nontacky, translucent, almost white in appearance and had hydrophilic surfaces. Upon wetting the films with water, a uniform and continuous film of water formed on the surfaces indicating that the film surface was hydrophilic.

Example II

An acid treating bath consisting of 30 grams of $Na_2Cr_2O_7 \cdot 2H_2O$, 36 ml. of water, and 300 ml. of concentrated $H_2SO_4$ as described in Example I was prepared. Three sheets of polyethylene terephthalate photographic film base described in Example I were treated in the bath at room temperature (about 23° C.) for 1, 5 and 15 seconds, respectively. The treated films were then transferred to a cold quiescent water bath, removed to a second bath of running cold water, washed for 5 minutes, and air-dried as described in Example I. They had hydrophilic surfaces and these films were bleached as described in Example I. The resultant films were nontacky, transparent, almost white in appearance and had hydrophilic surfaces. Upon treatment of the films with water, a uniform and continuous film of water formed on the surfaces.

Example III

Dry, NaOH-bleached, translucent polyethylene terephthalate photographic film base having hydrophilic surfaces was prepared by the procedure described in Example I, except that the treated film, while still wet, was immersed for 45 seconds at about 23° C. in 15% aqueous NaOH. Four film sheets, as described above, were dip-coated in darkness with a gelatino-silver bromochloride photographic emulsion containing rice starch. The rice starch was prepared as an aqueous slurry (50% solids), and the amount added to the emulsion was equivalent to 1 gram of dry rice starch to 3 grams of gelatin binder. After drying, the films were exposed through a negative, developed for 2.5 minutes at 20° C. in the following developer solution:

| | Grams |
|---|---|
| Sodium sulfite, anhydrous | 30 |
| Paraformaldehyde | 7.5 |
| Sodium bisulfite | 2.2 |
| Boric acid | 7.5 |
| Hydroquinone | 22.5 |
| Potassium bromide | 1.6 |
| Water to make 1 liter. | | and were fixed, washed and dried in the conventional manner. The prints prepared had sharp, dense black photographic images on a translucent background. Ink receptivity was good. A 2H pencil gave good pencil density on the coated surface. The pencil density of a 4H drawing pencil was satisfactory. The anchorage of the emulsion coating to the bleached, treated base surface was tested by making several intersecting cuts through the emulsion layer into the treated film base of one of the bleached film sheets, placing a cellophane pressure-sensitive adhesive tape over the cuts, and sharply pulling the adhesive tape back. Upon inspection, no separation of the emulsion from the treated film base was observed. The anchorage of the emulsion coating to the bleached, treated base was also tested during all conventional processing operations including developing, fixing and washing. Three film sheets were removed respectively from the developer, fixer and washing bath and several intersecting cuts were made through the wet emulsion layer into the bleached, treated film bases. While the film sheets were still wet, attempts were made to slide the emulsion layer from the bases. In addition, the films were torn to determine whether the emulsion would lift from the base under this severe treatment. Adhesion was found to be excellent with no separation of the emulsion layer from the treated base.

Example IV

Two NaOH-bleached sheets of polyethylene terephthalate photographic film base, one translucent and prepared as described in Example I and the other transparent and prepared as described in Example II, and both having hydrophilic surfaces, were dip-coated in a resin subbing solution comprised of a tri-component copolymer of vinylidene chloride, acrylic ester and itaconic acid prepared as described in Example II of Swindells U.S. Patent 2,698,235. Due to the hydrophilic nature of the treated polyester surface the additional quantity of sodium dodecyl sulfate mixture, described in Example 1 of Swindells U.S. Patent 2,698,235, required to promote good wettability of the surface of the untreated polyester film was not necessary and was not used. The two coated sheets were dried at room temperature, heated in an air oven at 165° C. for 45 seconds and then cooled The dry-anchorage of the sub coating to the treated base was tested by the procedure described in Example III. The anchorage was excellent for both the translucent and transparent films. Two other bleached treated sheets of film base, one translucent and the other transparent on which the tricomponent copolymer described above had been coated, were dyed with a solution of Malachite Green (C.I. No. 657) prepared from 1 g. of the dye in 100 ml. ethylene glycol monoethyl ether. The uniform dye color which did not wash off in cold water indicated a uniform copolymer sublayer was present on both the translucent and transparent treated photographic film bases.

Example V

A solution was prepared consisting of 16 grams of $Na_2Cr_2O_7 \cdot 2H_2O$, 24 ml. of $H_2O$ and 200 ml. of concentrated $H_2SO_4$ and the resultant solution cooled to 5° C. Five sheets of uncoated polyethylene terephthalate photographic film base were immersed in the cold solution for 15 seconds each. The sheets of film had transparent hydrophilic surfaces which had a light yellow tint. They were then immersed in quiescent, cold water (15° C.) until the excess dichromate-acid had run off. The film sheets were then washed in running cold water for 10 minutes. Without drying, the treated film sheets were bleached by immersing for 30 seconds at about 23° C. in a 15% aqueous solution of KOH. The bleached film sheets were washed in cold water for 5 minutes to remove excess KOH and hung to dry in air. The surfaces of these five treated films were clear and transparent. A sixth film sheet was treated as above except that the bleaching operation was omitted. This film had a hydrophilic surface with a light yellow tint.

The six treated film sheets were coated in the dark with a gelatino-silver iodobromide photographic emulsion containing about 2% iodide and about 98% bromide. The anchorage, base to emulsion, of four of the film sheets was tested, one dry and three wet, and after treatment in developer, fixer and washing bath, respectively, by the procedure described in Example III. Excellent anchorage, both dry and wet, was obtained.

The silver halide from the emulsion layer of the fifth film sheet was removed by conventional fixer solution. Then the sheet was washed for 15 minutes and hung to dry. The fixed, dry film sheet was essentially transparent and when compared to the color control film demonstrated that the bleaching step removed essentially all the color. The anchorage, base to emulsion, of the dry film was tested as described in Example III. Satisfactory emulsion anchorage was obtained.

*Example VI*

Two sheets of uncoated, oriented polyethylene terephthalate photographic film base were treated for 15 seconds with the chromic acid treatment solution described in Example I. The treated sheets were then bleached as described in Example I. The bleached, treated sheets of film base were laid flat and overcoated by pouring onto the sheets a solution consisting of 5 grams of photopolymerizable granules, prepared as described in Example 3 of the application of Burg, Ser. No. 750,868 filed July 25, 1958, and 100 ml. of acetone. Upon drying, a thin layer of photopolymerizable material, 0.3 mil thick, remained on the film sheets. The coated sheets were then exposed through a transparency containing halftone and lines to an 1800-watt high-pressure mercury-arc lamp to 7 watt-seconds/square inch of actinic radiation. The sheets were sprayed with a 0.04 molar solution of sodium hydroxide for 75 seconds, followed by a water spray wash and dried. A relief image of approximately 0.3 mil was obtained with satisfactory anchorage of the image to the film base support.

*Example VII*

Three sheets of uncoated oriented polyethylene terephthalate photographic film base described in Example I were treated with the chromic acid treatment solution and alkali bleach solution described in that example. The bleached, treated sheets were then coated with a predominantly aqueous dispersion of a water-soluble urea-formaldehyde resin containing finely divided silica and cured by reducing the pH to about 2 to 3 and heating the coated layer as described in assignee's Van Stappen application Serial No. 774,822 filed November 19, 1958, now U.S. Patent 2,964,423, issued December 13, 1960. A scratch-resistant, ink-receptive, translucent layer with a pencil tooth finish usable with a 6H pencil, firmly attached to the bleached, treated film base, was obtained. The anchorage of the coating to the base was satisfactory.

*Example VIII*

A copolyester was prepared from 100 g. of bis(2-hydroxyethyl)terephthalate and 22.6 g. of bis(2-hydroxyethyl)sebacate, by the procedure described in Whinfield et al., U.S. Patent 2,465,319 issued March 22, 1949. The copolyester was pressed at 275° C. into discs 40 mils in thickness and the discs were immediately quenched in water. The discs were then stretched biaxially at 50° C. to give a transparent, oriented film, 4 mils in thickness. A 2 by 6 inch piece of stretched polyester was immersed for 5 seconds at room temperature in a treatment solution consisting of 3.16 g. of $Na_2Cr_2O_7 \cdot 2H_2O$, 5.9 g. of $H_2O$ and 70.0 g. of concentrated $H_2SO_4$ described in Example I. The film was removed from the treatment solution and quenched in a bath of cold tap water (17° C.) for 10 seconds. The film was washed in running water for 30 seconds and then treated for 30 seconds in 20% aqueous NaOH maintained at 25° C. The resultant film had a uniform surface which was almost white in appearance, translucent and hydrophilic.

*Example IX*

Example VIII was repeated except that the copolyester was prepared from 150.0 g. of bis(2-hydroxyethyl)terephthalate, 18.7 g. of bis(2-hydroxyethyl)sebacate. The resulting film had a uniform surface which was almost white in appearance, translucent and hydrophilic.

Sodium dichromate is preferred for preparing the treatment reagent because of its solubility characteristics. Since chromic acid ($H_2CrO_4$) is the active chemical species in the treatment reagent, it will be understood that effects similar to those achieved by the sodium dichromate/$H_2SO_4$/$H_2O$ system can be achieved by using amounts of other chromic acid-yielding chromium compounds, e.g., $CrO_3$, chromate or dichromate salts (which will give chromic acid in the presence of $H_2SO_4$ and water) to give within solubility limitations an equivalent amount of chromic acid in the treatment reagent.

The composition of the sodium dichromate/$H_2SO_4$/water treatment reagent can vary, as described above, according to the results desired. In some reagent compositions however, particularly at high sodium dichromate and low water concentrations, upon standing for varying periods of time, a brownish-red solid precipitates, thereby reducing the effective concentration of the treatment reagent solution. It is, therefore, preferred that the treatment reagent be used before the brownish-red solid precipitates. The solution may be used after precipitation but treatment results will differ. Precipitations may also be avoided by continuously mixing an aqueous solution of the dichromate with sulfuric acid by means of a proportioning pump, thereby forming and delivering the reagent to the treatment station at the rate at which it is being consumed.

This invention is, of course, not limited to the treatment of the surfaces of the particular polyesters of the foregoing examples. Similar results can be obtained by treating films composed of any of the high-melting, difficulty soluble, usually microcrystalline, cold-drawing linear, highly polymerized esters of terephthalic acid and glycols of the series $HO(CH_2)_nOH$, where $n$ is an integer within the range of 2 to 10, described in Whinfield et al. U.S.P. 2,465,319. Other useful polyester films which can be treated include those prepared from highly polymerized esters of terephthalic acid and at least one glycol of the formula $HOCH_2$—W—$CH_2OH$ where W is polymethylene or alkyl-substituted polymethylene of 0 to 8 carbons, e.g., 2,2-dimethylpropylene-1,3 or a cycloalkylene radical of 5 to 6 carbon atoms, e.g., cyclopentyl-1,3, and cyclohexyl-1,4. In addition, copolyester films prepared comprising up to 85 mole percent isophthalic acid and 15% or more of terephthalic acid components such as are disclosed in British patent specification 766,290 can be used. Films comprising up to 20 mole percent of aliphatic and cycloaliphatic dicarboxylic acids, e.g., succinic, glutaric, adipic, hexahydroterephthalic and sebacic acids, based on total moles of acid, in addition to at least 15 mole percent terephthalic acid, are also useful. It has been found, however, that when such aliphatic dicarboxylic acids are used with the polyethylene terephthalate polyester or copolyester reactants described above, due to increased sensitivity of the aromatic-aliphatic dicarboxylic acid copolyester in the $H_2SO_4$—$H_2O$ solvent system, a greater amount of water must be used in order to obtain a transparent form of the treated aromatic-aliphatic copolyester film. The aromatic-aliphatic copolyester films have hydrophilic surfaces when treated by reagent solutions in the broad concentration range. The above-described polymers may contain a number (e.g., 1 to 12 or more) of ether groups in the polymer chain. Such ether groups may be present as part of ether-containing glycol derivatives or formed by side reactions during the polymerization.

The acid treated film should be quenched immediately because the effect of the strong acid will continue until the reagent is either consumed or diluted and removed, e.g., washed off the film surface. Water that is preferably quiescent or non-turbulent is used as the quenching bath so that the swollen surface of the film will not be distorted by currents of water. It is not necessary that the film be quenched in a bath because a fine spray or other washing means that will not affect the treated film surface can also be used. While it is preferred that cold water, e.g., 10 to 15° C. be used, warmer water, e.g., at room temperature (25° C.) or higher can be used.

The bleach solution for removing the yellow color due to chromium compounds in and on the hydrophilic surfaces of the film preferably consists of an aqueous sodium or potassium hydroxide, but other alkali metal hydroxides may be used, e.g., lithium, cesium, and rubidium. The concentration of the alkali metal hydroxide in the solution may vary from 0.5 to 30% by weight and the temperature of the solution may range from 5 to 80° C. The chromic acid treated film base should be contacted with aqueous alkali metal hydroxide solution for about 1 second or more. At dilute hydroxide concentrations the treated film can remain in contact with the hydroxide, however, for an indefinite period without deleterious effect, but as the hydroxide concentration increases, the maximum contact time should be regulated to prevent total dissolution of the treated surface. The preferred contact time is 10 to 60 seconds when a 10 to 20 percent hydroxide solution is used. As the concentration of the alkali increases and/or the temperature is raised, the time required for bleaching decreases. Simultaneously, alkaline hydrolysis of the surface sets in imposing a practical upper limit on the temperature and alkali concentration in the bleach process. When the treated film is dried prior to bleaching, it is preferred that the bleach solution be comprised of 20% alkali and the temperature be maintained at 40° C. The film need not be dried, however, and the color has been essentially bleached out using a 20% alkali solution at room temperature (about 23° C.). At elevated temperatures, however, it is preferred that the treated film base be dried prior to bleaching.

The polyester film base having hydrophilic surfaces obtained in accordance with the processes of this invention, are useful for purposes other than making photographic film. The hydrophilic surfaces have improved wettability and excellent receptivity to printing inks. They are also useful for making films which have a translucent background.

The novel photographic film bases of the invention are especially useful in making photographic films of all types including those of the X-ray, graphic arts and motion picture type, both black and white, and color. In fact, any of the radiation-sensitive materials and the water-permeable colloids described in the U.S. Patent 2,779,684, particularly in columns 6 and 7, can be applied to the hydrophilic surfaces of the acid-treated polyester film bases of this invention.

The fact that one can produce a good hydrophilic surface on a polyethylene terephthalate film base is quite surprising since it is known that concentrated sulfuric acid dissolves and deorients such polymers. In view of this fact, one would expect the presence of such a strong oxidizing agent as chromic acid in sulfuric acid to have a somewhat deleterious effect rather than to confer excellent hydrophilic properties to the surface of films made from oriented polyesters of the foregoing type.

The invention enables one to obtain either a translucent or a transparent, clear, i.e., essentially colorless, polyester film with a hydrophilic surface by simply varying the constitution of the acid treating solution. Both forms have properties superior to those of untreated poly(polymethylene)terephthalate films.

An advantage of the invention is that it provides new and improved poly(polymethylene) terephthalate and related polymeric film bases. Another advantage is that it provides new photographic film elements. Yet another advantage is that it provides a simple, quick, dependable and economical process for producing non-tacky, essentially colorless, uniform hydrophilic surfaces to poly(polymethylene) terephthalate and related polymeric film bases. A further advantage of the invention is that it eliminates the need for subcoating polyester film bases of the foregoing type in order to improve adherence of layers of light-sensitive silver halide emulsion water-permeable organic colloids having protective colloid properties.

Additional advantages are that the chromic acid/sulfuric acid solutions affect only the surface of the poly(polymethylene) terephthalate film base so that no cracking or delamination can occur as with laminated supports or supports coated with sublayers, e.g., cellulose ester film base with resin coatings and polyethylene terephthalate films coated with a resin or copolymer sublayer.

The alkali hydroxide bleach treatment of this invention does not have any deleterious effect on sensitized water-permeable organic colloid layers coated on the bleached acid-treated base, which is a further advantage.

What is claimed is:

1. A process for producing an essentially colorless translucent to transparent hydrophilic surface on a hydrophobic film essentially composed of a highly polymeric polyester of
   (1) at least one dihydric alcohol of the formula $HOCH_2$—$W_n$—$CH_2OH$ where W is a divalent hydrocarbon radical taken from the group consisting of methylene, polymethylene and alkyl-substituted polymethylene of 1–8 carbon atoms and cycloaliphatic radicals of 5–6 carbon atoms and $n$ is one of the cardinal numbers 0 and 1 and
   (2) at least one dicarboxylic acid, at least 15 mole percent of said acid being terephthalic acid, up to 20 mole percent being an aliphatic dicarboxylic acid and the remaining dicarboxylic acid being selected from the group consisting of terephthalic acid and isophthalic acid, which comprises
   (a) contacting at least one surface of said film with a solution comprising 82–98.8 parts by weight of $H_2SO_4$, 1–14.5 parts by weight of water and an amount of chromic acid-yielding compound selected from the group consisting of chromium trioxide, chromic acid salts and dichromic acid salts equivalent to 0.1–4.0 parts by weight $Cr_2O_3$ until a hydrophilic surface is formed on the film,
   (b) contacting said treated surface of the film with an excess of water followed by
   (c) contacting said resulting treated surface of the film with a 0.5%–30% aqueous alkali metal hydroxide solution to remove residual color.

2. A process as defined in claim 1 wherein step (a) is carried out in a period of 0.1 to 60 seconds.

3. A process as defined in claim 1 wherein step (b) is carried out by first immersing the film in a quiescent water bath and the film is then washed with flowing water.

4. A process as defined in claim 1 wherein the film resulting from step (c) is washed with flowing water.

5. A process as defined in claim 1 wherein $$Na_2Cr_2O_7.2H_2O$$

is used as the chromic acid-yielding compound.

6. A process as defined in claim 1 wherein 84.0 to 87.0 parts $H_2SO_4$, 9.4 to 12.4 parts $H_2O$ and chromic acid-yielding compound equivalent to 0.5–2.7 parts of $Cr_2O_3$, all by weight, are used.

7. A process as defined in claim 1 wherein 87.4–96.0 parts $H_2SO_4$, 2.0–5.6 parts $H_2O$ and chromic acid-yielding compound equivalent to 1.0–3.6 parts $Cr_2O_3$, all by weight, are used.

8. A process as defined in claim 1 wherein 84.0–87.0 parts $H_2SO_4$, 9.4–12.4 parts $H_2O$ and 1.0–5.5 parts $Na_2Cr_2O_7.2H_2O$, all by weight, are used.

9. A process as defined in claim 1 wherein 87.4–96.0 parts $H_2SO_4$, 2.0–5.6 parts $H_2O$ and 2.0–7.0 parts $Na_2Cr_2O_7.2H_2O$, all by weight, are used.

10. A process as defined in claim 1 wherein said polyester is biaxially oriented.

11. A process as defined in claim 1 wherein said polyester is biaxially oriented polyethylene terephthalate having a melting point of at least 250° C.

12. A process as defined in claim 1 wherein sodium hydroxide is used.

13. A film comprising a highly polymeric polyester of
   (1) at least one dihydric alcohol of the formula $HOCH_2-W-CH_2OH$ wherein W is a divalent hydrocarbon radical selected from the group consisting of methylene, polymethylene and alkyl-substituted polymethylene of 0 to 8 carbons and cycloalkylene of 5–6 carbons and
   (2) at least one dicarboxylic acid, at least 15 mole percent of said acid being terephthalic acid, up to 20 mole percent being an aliphatic dicarboxylic acid and the remaining dicarboxylic acid being selected from the group consisting of terephthalic acid and isophthalic acid, said film having at least one essentially colorless hydrophilic surface and obtained by the process defined in claim 1.

14. A film as defined in claim 13 wherein at least one of said hydrophilic surfaces carries a layer embodying a water-permeable organic colloid having protective colloid properties.

15. A film as defined in claim 14 wherein said colloid has dispersed therethrough light-sensitive silver halide.

16. A film as defined in claim 14 wherein said colloid is gelatin.

References Cited in the file of this patent

UNITED STATES PATENTS

| | | |
|---|---|---|
| 2,668,134 | Horton | Feb. 2, 1954 |
| 2,805,173 | Ambler | Sept. 3, 1957 |
| 2,805,960 | Wolinski | Sept. 10, 1957 |
| 2,943,937 | Nadeau et al. | July 5, 1960 |

FOREIGN PATENTS

| | | |
|---|---|---|
| 683,218 | Great Britain | Nov. 26, 1952 |